United States Patent
Scheitlin (10) Patent No.: US 9,476,985 B2
(45) Date of Patent: Oct. 25, 2016

(54) SYSTEM AND METHOD FOR REAL TIME SUBSET GEOMETRY SCREENING SATELLITE CONSTELLATIONS

(71) Applicant: Honeywell International Inc., Morristown, NJ (US)

(72) Inventor: Joseph E. Scheitlin, Plymouth, MN (US)

(73) Assignee: Honeywell International Inc., Morris Plains, NJ (US)

( * ) Notice: Subject to any disclaimer, the term of this patent is extended or adjusted under 35 U.S.C. 154(b) by 705 days.

(21) Appl. No.: 13/847,645

(22) Filed: Mar. 20, 2013

(65) Prior Publication Data

US 2014/0285376 A1 Sep. 25, 2014

(51) Int. Cl.
*G01S 19/07* (2010.01)
*G01S 19/08* (2010.01)

(52) U.S. Cl.
CPC ............ *G01S 19/07* (2013.01); *G01S 19/08* (2013.01)

(58) Field of Classification Search
CPC .............................. G01S 19/07; G01S 19/08
See application file for complete search history.

(56) References Cited

U.S. PATENT DOCUMENTS

| | | | |
|---|---|---|---|
| 5,631,838 A | 5/1997 | Ishikawa et al. | |
| 6,356,232 B1 | 3/2002 | Rocken et al. | |
| 6,639,549 B2 | 10/2003 | Vanderwerf et al. | |
| 8,106,823 B2 | 1/2012 | Schroth | |
| 8,131,463 B2 | 3/2012 | Lopez et al. | |
| 8,203,482 B2 | 6/2012 | Azaola Saenz | |
| 2011/0291887 A1 | 12/2011 | Pulford | |
| 2012/0206298 A1 | 8/2012 | Alanen et al. | |
| 2012/0208557 A1 | 8/2012 | Carter | |

OTHER PUBLICATIONS

European Patent Office, "European Search Report from EP Application No. 14160168.2 mailed Aug. 29, 2014", "from Foreign Counterpart of U.S. Appl. No. 13/847,645", Aug. 29, 2014, pp. 1-4, Published in: EP.

(Continued)

*Primary Examiner* — Cassie Galt
(74) *Attorney, Agent, or Firm* — Fogg & Powers LLC (57) ABSTRACT

A method for real time subset geometry screening comprises the steps of determining a list of satellites in view of a ground based augmentation system in a navigation satellite system for a subsequent time interval in the future, defining at least one set of subset geometries from the list of available satellites, calculating a respective first $\sigma_{vig}$ for each of the at least one set of subset geometries, setting a respective broadcast $\sigma_{vig}$ for each set of subset geometries as the larger of the first $\sigma_{vig}$ and a second $\sigma_{vig}$, wherein the second $\sigma_{vig}$ was calculated for the previous time interval, saving the first $\sigma_{vig}$ for a next iteration of the method, and selecting from the plurality of broadcast $\sigma_{vig}$ to match an available broadcast constellation. $\sigma_{vig}$ is a vertical ionosphere gradient standard deviation.

18 Claims, 4 Drawing Sheets

(56) References Cited

OTHER PUBLICATIONS

Lee et al., "Assessment of Nominal Ionosphere Spatial Decorrelation for LAAS", "Proceedings of IEEE/ION Plans 2006", Apr. 27, 2006, pp. 506-514.

Park et al., "Mitigation of Anomalous Ionosphere Threat to Enhance Utility of LAAS Differentially Corrected POsitioning Service (DCPS)", "Proceedings of IEEE/ION Plans 2008", May 8, 2008, pp. 285-293.

Lee et al., "Position-Domain Geometry Screening to Maximize LAAS Availability in the Presence of Ionosphere Anomalies", Jul. 14, 2011, pp. 1-16.

Pullen et al., "The Impact and Mitigation of Ionosphere Anomalies on Ground-Based Augmentation of GNSS", "12th International Ionospheric Effects Symposium (IES 2008), Session 4A, Paper #6", May 14, 2008, pp. 1-24, Publisher: Stanford University.

European Patent Office, "Office Action from EP Application No. 14160168.2 mailed Sep. 15, 2014", "from Foreign Counterpart of U.S. Appl. No. 13/847,645", Sep. 15, 2014, pp. 1-5, Published in: EP.

SYSTEM AND METHOD FOR REAL TIME SUBSET GEOMETRY SCREENING SATELLITE CONSTELLATIONS

BACKGROUND

Ground Based Augmentation Systems (GBAS) for a navigation satellite systems (NSS) broadcast one or more parameters that can be received by a NSS receiver to correct for various errors in the satellite signals received. One such broadcast parameter is the Vertical Ionosphere Gradient standard deviation, also referred to as sigma-vig ($\sigma_{vig}$). $\sigma_{vig}$ is used to protect against errors caused by anomalous ionosphere gradients in a Local Area Augmentation System (LAAS).

Typically, $\sigma_{vig}$ is calculated for a future time based on the satellites that will be in view of the GBAS at the future time. Since satellites orbit the earth twice each sidereal day, over time, different satellites rise and set from the perspective of the GBAS. On every cycle, the calculation of $\sigma_{vig}$ is performed for a subsequent time epoch, the next time interval in the future, for all predicted satellites which will be in view of the GBAS at the future time on all predicted sub-geometries. This calculation of $\sigma_{vig}$ is done considering both the maximum horizontal distance ($d_{dg\_max}$) from the LAAS Ground Facility (LGF), which is the GBAS reference location, to the decision height and the maximum horizontal distance ($d_{dh\_max}$) from the decision height to the user (aircraft). This real time geometry screening is applicable for protecting all approaches at an airport.

The larger of the values between the $\sigma_{vig}$ calculated for one time step in the future, and the $\sigma_{vig}$ value previously computed for what is now the current time step is broadcast to the NSS receivers. In some implementations, $\sigma_{vig}$ is calculated at 1 minute intervals to minimize the occurrence of having more than one satellite rise and set in one time increment. At each interval, it calculates a $\sigma_{vig}$ value. The $\sigma_{vig}$ value that will be broadcast is the maximum between the most recently calculated $\sigma_{vig}$ and the $\sigma_{vig}$ that was calculated the previous minute.

SUMMARY

In one embodiment, a method for real time subset geometry screening is provided. The method for real time subset geometry screening comprises the steps of determining a list of satellites in view of a ground based augmentation system in a navigation satellite system for a subsequent time interval in the future, defining at least one set of subset geometries from the list of available satellites, calculating a respective first $\sigma_{vig}$ for each of the at least one set of subset geometries, setting a respective broadcast $\sigma_{vig}$ for each set of subset geometries as the larger of the first $\sigma_{vig}$ and a second $\sigma_{vig}$, wherein the second $\sigma_{vig}$ was calculated for the previous time interval, saving the first $\sigma_{vig}$ for a next iteration of the method, and selecting from the plurality of broadcast $\sigma_{vig}$ to match an available broadcast constellation. As used in this embodiment, $\sigma_{vig}$ is a vertical ionosphere gradient standard deviation.

DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

Problems can arise in the conventional determination of $\sigma_{vig}$ when a satellite is included in the current calculation of $\sigma_{vig}$ that was not included in the previous $\sigma_{vig}$, or when a satellite that was included in the previous $\sigma_{vig}$ calculation is no longer a part of the current calculation of $\sigma_{vig}$.

The subject matter described herein relates to a GBAS system that determines a set of future $\sigma_{vig}$ values, and selects from the set of future $\sigma_{vig}$ values to obtain a $\sigma_{vig}$ value that protects an aircraft with a worst case geometry of two lost satellites on approach. Each $\sigma_{vig}$ of the set of $\sigma_{vig}$ values is applicable to each respective sets of N number of satellites to N−2 satellites. This set of broadcast $\sigma_{vig}$ values remains valid until a new set of broadcast $\sigma_{vig}$ values are determined.

A geometry screening algorithm pre-calculates up to five $\sigma_{vig}$ values ($\sigma_{vig\_broadcast}[1\text{-}5]$) for each inflation interval. To maximize availability, rather than including all satellites in only one set of subset geometries, that is N, N−1, down to 4, geometry screening generates a list of up to five $\sigma_{vig\_broadcast}$ values to provide an optimal screening value for each potential broadcast set of satellite corrections, N, and associated subset geometries. To ensure the $\sigma_{vig}$ inflation is available for comparison at the start of a given time interval, screening is performed for one time step in the future.

The satellite vehicle (SV) constellation geometry nominally varies slowly over time. However, the rising or setting of any SV creates a discontinuity in the constellation geometry. Each satellite which is to be included in the broadcast set must be a part of the screened set of satellites. Therefore, to ensure that the current set of satellites are immediately available for broadcast (present at the beginning and end of the screened interval) the set of screened satellites includes the newly risen or readmitted satellites in the interval prior to their arrival and the setting or excluded satellites remain in the screened set following their departure.

Therefore the sets of satellites screened provide inflation values for all potential sets of satellites resulting from rising, setting, excluded and readmitted satellites during any given time interval.

Figure 1:
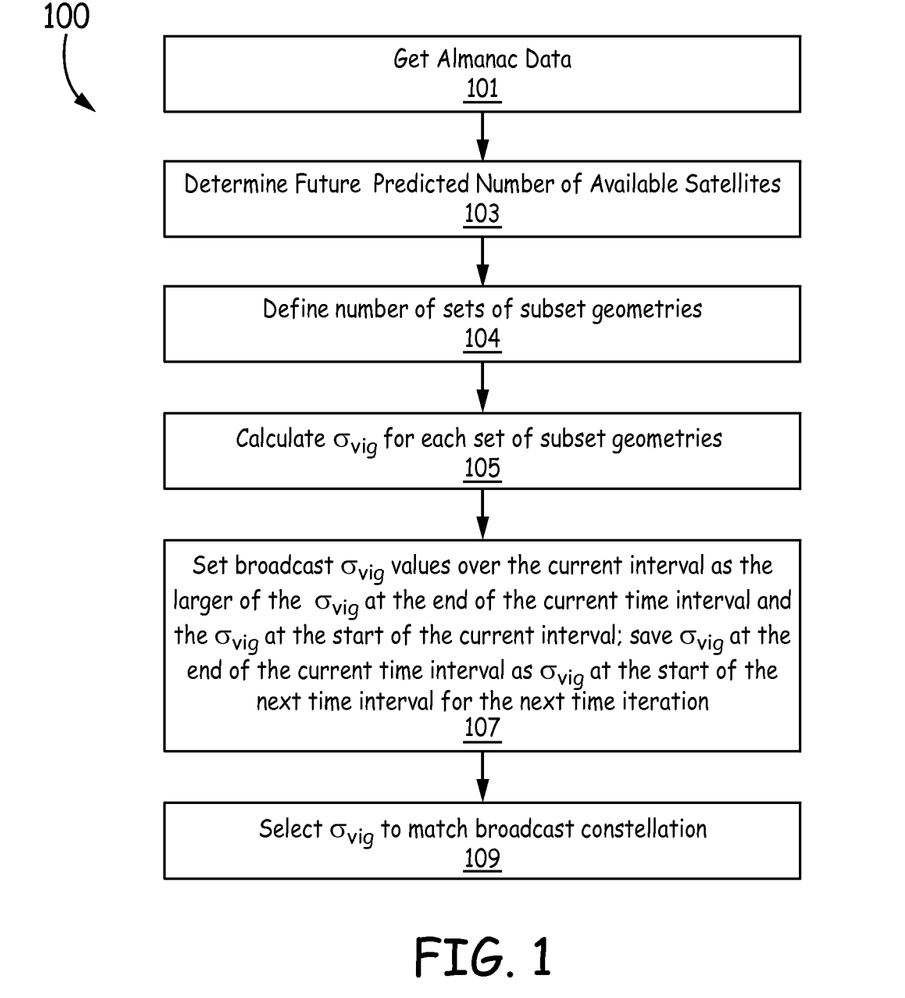
FIG. 1 illustrates exemplary methodology for one embodiment of real time subset geometry screening for varying satellite constellations.
Figure 2:
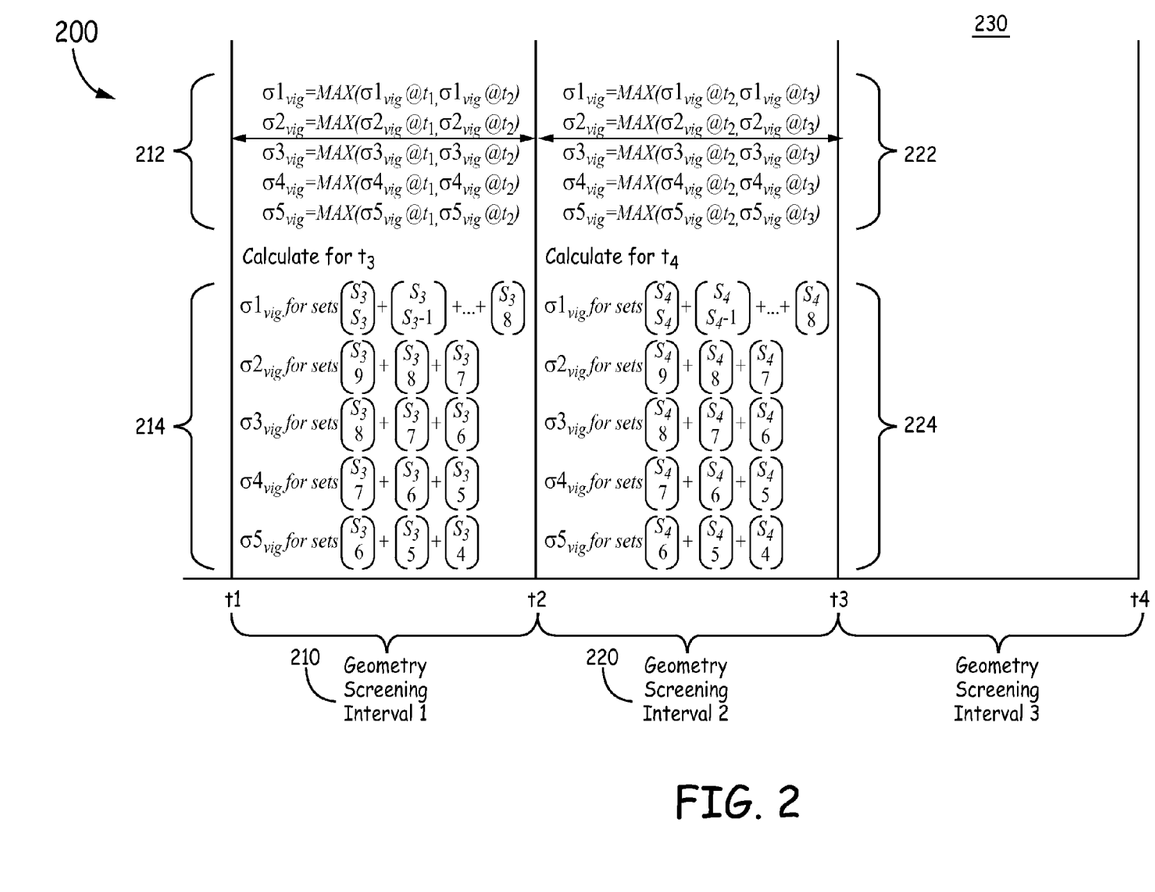
FIG. 2 illustrates a graphical representation of a method for real time geometry screening over time.

FIG. 1 illustrates an example method 100 for real time subset geometry screening for varying satellite constellations. The method calculates a $\sigma_{vig}$ value one time interval in the future. FIG. 2 illustrates an example method for real time subset geometry screening along a graphical representation of a time axis 200. FIGS. 1 & 2 will be described simultaneously for explanatory purposes.

At block 101, almanac data is retrieved updated. Using the most recently collected and validated almanac, a set of healthy and usable satellites at the end point of the current interval is determined, at block 103. SVs that will either set or will enter a selective mask during that interval and SVs that will rise or leave a selective mask during the next interval are included in the list. In order to calculate the predicted rise and set of any given SV, the almanac is used to compute the SV position and velocity in Earth-Centered Earth-Fixed (ECEF) coordinates. SV ECEF position and velocity are used to calculate the range and the line of sight vectors in the E-frame. Using the line of sight vectors, the elevation and azimuth values for each satellite is determined, which are then tested to find if the satellite is available to the GBAS. The predicted rise and set times are also checked against any reference receiver selective masks to make sure they correspond to what the system and user will experience.

At block 104, the number of sets of subset geometries is defined. "S" defines the maximum number of satellites visible and tracked in either the current or previous inflation interval. S is limited to a minimum of 4, as the geometry screening algorithm is not performed if S is less than 4. S is constant over an inflation interval and does not change across sets of subset geometries. S is picked as the larger of the number of satellites for the current inflation interval end point, or the previous interval end point. This assures that $\sigma_{vig}$ will cover any geometry change between the inflation interval end points. In one embodiment, the interval period is 150 seconds.

Given S satellites, only a single geometry includes all S satellites. There are an additional S number of geometries which contain all combinations of S−1 satellites. There are an addition $(S^2-S)/2$ geometries which contain all the combinations of S−2 satellites. Each of these geometries is defined to be a subset geometry, and a specified group of subset geometries is devoted to be a set of subset geometries.

N defines the number of satellites to be chosen from S visible satellites to generate a particular set of subset geometries. Each set of subset geometries is used to generate each $\sigma_{vig}$ value (up to five values) for that inflation interval end point. Up to five separate sets of subset geometries are maintained for each interval period, where the number of sets of subset geometries is denoted as $NS_{comb}$. For each set of subset geometries, one inflated $\sigma_{vig}$ value is generated, meaning that a total number of $NS_{comb}$ separate $\sigma_{vig}$ values are calculated. The current set of subset geometries is referred to as CS, and the number of combinations or geometries within that particular set is $N_{comb}$.

In one embodiment, S≥10. The total number of sets of subset geometries is then $NS_{comb}$=5. For N≥10 and N=S, the fifth of five sets of subset geometries is described by the following permutations of satellites:

$$N_{comb} = \binom{S}{N} + \binom{S}{N-1} + \binom{S}{N-2} + \ldots + \binom{S}{9} + \binom{S}{8}$$

$\sigma_{vig\_broadcast}[5]$ is then computed to protect all subset geometries within this set. When S≥10, geometry screening is required to reduce down to 8 satellites while protecting any geometry changes between the current inflation interval end point and the previous interval end point.

For 10>N≥6, $N_{comb}$ for N-satellite combinations is selected from 9 down to 6 for the fourth through first sets of subset geometries are calculated. $\sigma_{vig\_broadcast}[4]$-[1] are then computed to protect all relevant combinations of satellites.

In another embodiment 10>S≥6. $NS_{comb}$=S−5. Select all combinations of N for N=S down to 6. $N_{comb}$ is calculated for the fourth through first sets. $\sigma_{vig\_broadcast}[S-5]$-[1] are computed to protect all relevant combinations of satellites. In this embodiment, $\sigma_{vig\_broadcast}[5]$-[S−4] are undefined.

In another embodiment, S=5, and $NS_{comb}$=1. When the number of satellites being selected is S=5, both N and S are equal. A single set of subset geometries $N_{comb}$ is calculated. $\sigma_{vig\_broadcast}[1]$ is then computed to protect all combinations of 5 and 4 satellites. In this case, $\sigma_{vig\_broadcast}[5]$-[2] are undefined.

In another embodiment, S=4. $NS_{comb}$=1. When the number of satellites is 4, both N and S are equal. A single set of subset geometries is calculated $N_{comb}$. $\sigma_{vig\_broadcast}[1]$ is then computed to protect the single combination of 4 satellites that can be used for positioning.

At block 105, $\sigma_{vig}$ is calculated for each set of subset geometries. Global positioning system (GPS) satellite geometries vary slowly over time. However, a change in the usable set of satellites can occur quickly between inflation interval end points, thus requiring a new $\sigma_{vig}$ value to be broadcast. Since $\sigma_{vig}$ calculations are too CPU intensive to update in real time, the geometry screening algorithm pre-calculates up to five $\sigma_{vig}$ values ($\sigma_{vig\_broadcast}[1-5]$) for each inflation interval (one for each potential set of usable satellites) based up on validated almanac data. To maximize availability, rather than including all satellites in only one set of subset geometries, geometry screening generates a list of up to five $\sigma_{vig\_broadcast}$ values to provide an optimal screening value for each potential broadcast set of satellite corrections (N) and associated subset geometries.

At block 107, the $\sigma_{vig\_broadcast}$ is set for each set of subset geometries as the larger between the calculated $\sigma_{vig}$ at the end of the current time interval and the $\sigma_{vig}$ at the beginning of the current time interval. The $\sigma_{vig}$ at the end of the current time interval is saved for the next time iteration as the $\sigma_{vig}$ at the beginning of the next time interval for each respective set of subset geometries.

The steps above can be seen in relation to specific time intervals as seen in FIG. 2. In this exemplary embodiment, S≥10, and $NS_{comb}$=5. Geometry Screening Interval (GSI) 1 210 spans from t1 to t2. During GSI1 210, $\sigma_{vig\_broadcast}[1-5]$ is selected for each set of subset geometries based on formulas 212. Formulas 212 show $\sigma_{vig\_broadcast}[1]$ is chosen as the greater of $\sigma 1_{vig}$ calculated for the associated set of subset geometries at t1 and the $\sigma 1_{vig}$ calculated at t2. The associated set of subset geometries is discussed below. $\sigma_{vig\_broadcast}[2]$ is chosen as the greater of $\sigma 2_{vig}$ calculated for the set of subset geometry at t1 and the $\sigma 2_{vig}$ calculated for the subset geometry at t2. $\sigma_{vig\_broadcast}[3]$ is chosen as the greater of $\sigma 3_{vig}$ calculated for the set of subset geometry at t1 and the $\sigma 3_{vig}$ calculated for the subset geometry at t2. $\sigma_{vig\_broadcast}[4]$ is chosen as the greater of $\sigma 4_{vig}$ calculated for the set of subset geometry at t1 and the $\sigma 4_{vig}$ calculated for the subset geometry at t2. $\sigma_{vig\_broadcast}[5]$ is chosen as the greater of $\sigma 5_{vig}$ calculated for the set of subset geometry at t1 and the $\sigma 5_{vig}$ calculated for the subset geometry at t2.

Calculations 214 describe for which sets each $\sigma_{vig}$ is calculated. In this embodiment, $\sigma 1_{vig}$ is calculated for sets $$\binom{S}{S} + \binom{S}{S-1} + \binom{S}{S-2} + \ldots + \binom{S}{9} + \binom{S}{8}.$$

$\sigma 2_{vig}$ is calculated for sets $$\binom{S}{9} + \binom{S}{8} + \binom{S}{7}.$$

$\sigma3_{vig}$ is calculated for sets $$\binom{S}{8}+\binom{S}{7}+\binom{S}{6}.$$

$\sigma4_{vig}$ is calculated for sets $$\binom{S}{7}+\binom{S}{6}+\binom{S}{5}.$$

$\sigma5_{vig}$ is calculated for sets $$\binom{S}{6}+\binom{S}{5}+\binom{S}{4}.$$

Thusly, $\sigma1_{vig}$-$\sigma5_{vig}$ are calculated for time t3 during GSI1 210.

GSI2 220 spans from t2 to t3. During GSI2 220, $\sigma_{vig\_broadcast}[1-5]$ is selected for each set of subset geometries based on formulas 222, in much the same manner, except this time $\sigma1_{vig}$-$\sigma5_{vig}$ at time t2 is compared with $\sigma1_{vig}$-$\sigma5_{vig}$ at time t3. $\sigma1_{vig}$-$\sigma5_{vig}$ is calculated for time t4 based on calculations 224.

At block 109, a $\sigma_{vig\_broadcast}$ is selected to match the available broadcast set.

In one embodiment, suppose S=10 at inflation interval end point T, and S=9 at inflation interval end point T+1. The likely scenario is that a satellite will descend out of view between time epochs T and T+1. However, the constellation may change abruptly due to Reference Receiver Optimization resulting from a broadband interference event. For this reason, the geometry screening algorithm will generate $\sigma_{vig\_broadcast}[5]$ for the single 10-satellite constellation, $\sigma_{vig\_broadcast}[4]$ for all 9-satellite constellations, $\sigma_{vig\_broadcast}[3]$ for all possible 8-satellite constellations, $\sigma_{vig\_broadcast}[2]$ for all possible 8-satellite constellations, and $\sigma_{vig\_broadcast}[1]$ for all 6, 5, and 4 satellite constellations. If for any reason the number of tracked satellites changes from the expected maximum constellation of 10 satellites to something less, a new $\sigma_{vig}$ is selected to match the updated broadcast set.

Figure 3:
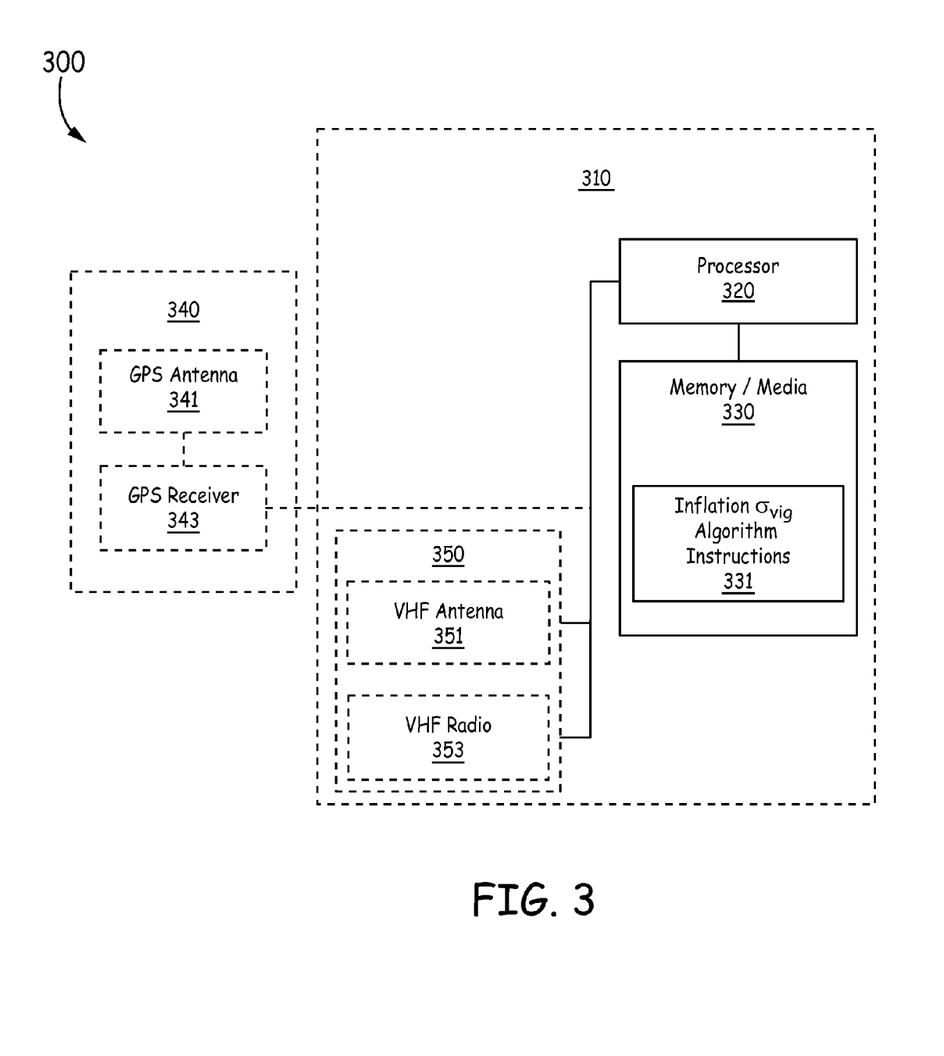
FIG. 3 illustrates a hardware block diagram according to one embodiment of an apparatus for real time subset geometry screening for varying satellite constellations.

FIG. 3 illustrates a hardware block diagram of an apparatus for real time subset geometry screening for varying satellite constellations 300 according to one embodiment. Real time subset geometry screening apparatus 310 comprises a processor 320 and system memory and/or some form of machine readable media 330. System memory 330 store instructions for a $\sigma_{vig}$ Inflation Algorithm 331 described above. In other embodiment the instructions 331 may be stored on random access memory (RAM), read only memory (ROM), flash memory, or any other form of memory known to those skilled in the art. In some embodiments, processor 320, system memory 330, and $\sigma_{vig}$ Inflation Algorithm 331 are implemented as a system on a chip. The processor 320 is also coupled to a GPS unit 340. In some embodiments, GPS unit 340 is a Remote Satellite Monitoring Unit (RSMU). In some embodiments, GPS unit 340 is located outside of the real time subset geometry screening apparatus 310. GPS unit 340 comprises a GPS antenna 341, and GPS Receiver 343. In some embodiments, the GPS antenna 341 is a multipath limiting antenna. Information from the GPS receiver 343 is coupled directly or indirectly to the processor 320. Very High Frequency (VHF) broadcast unit 350 is coupled to processor 320. In some embodiments VHF broadcast unit 350 is a VHF Data Broadcast (VDB) Cabinet. VHF broadcast unit 350 includes a VHF antenna 351, and VHF radio 353. In some embodiments, the VHF antenna may be housed outside of the real time subset geometry screening apparatus 310, and coupled to a VDB cabinet 350.

In some embodiments, real time subset geometry screening apparatus 310 is a differential global position system (DGPS) control unit 310 that includes a VDB cabinet 350 physically integrated into the same body of the DGPS 310, coupled to a RSMU 340. In some embodiments, DGPS 310 is the Honeywell SLS-4000 GBAS. DGPS 310 receives GPS information from RSMU 340 and status data from VDB cabinet 350, and performs $\sigma_{vig}$ Inflation Algorithm 331 with the data. After calculating $\sigma_{vig}$ inflation values, the $\sigma_{vig}$ broadcast value is broadcast by VDB cabinet 350.

Figure 4:
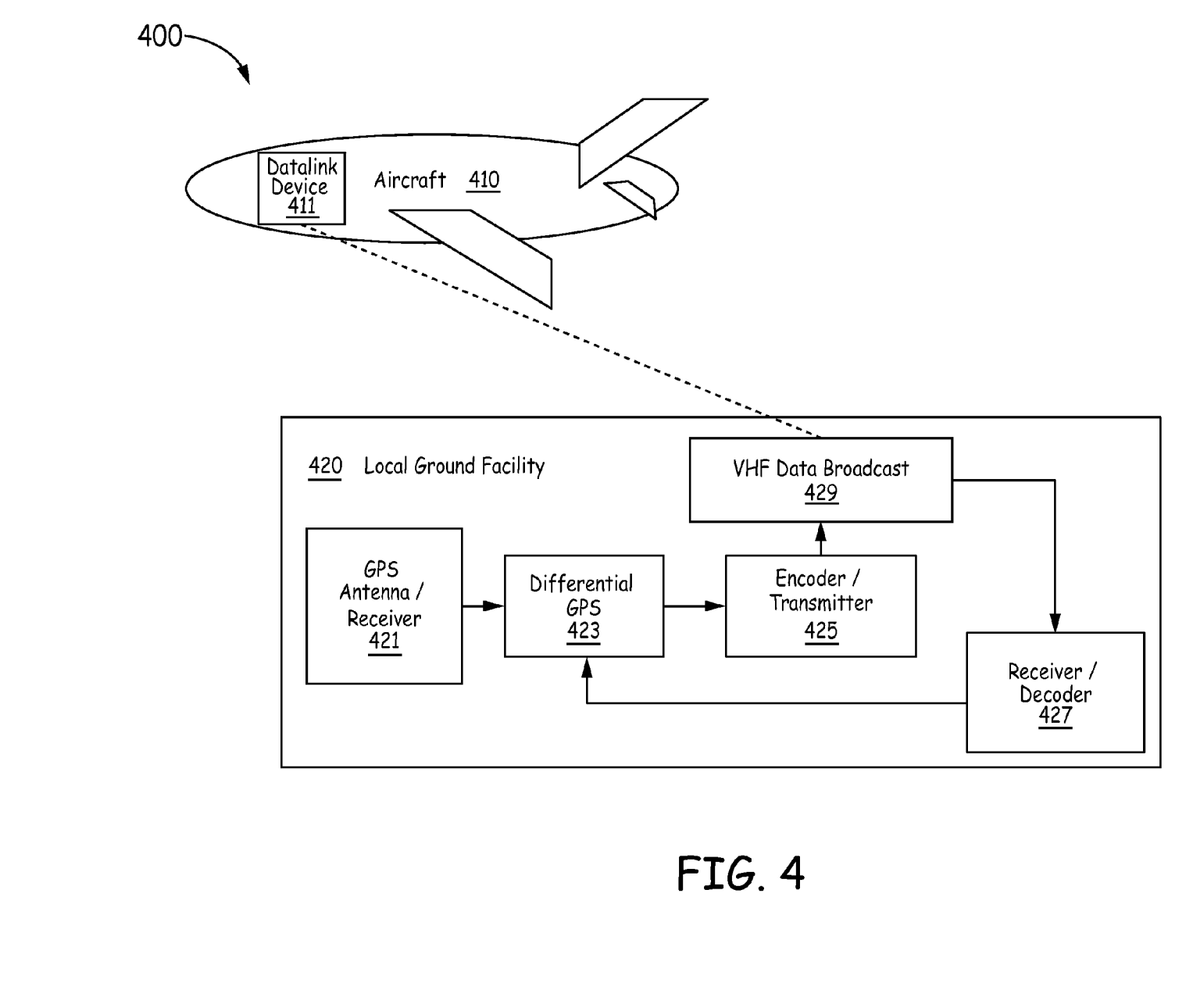
FIG. 4 illustrates an exemplary ground-based augmentation system (GBAS) for real time subset geometry screening for varying satellite constellations.

FIG. 4 illustrates an exemplary ground-based augmentation system (GBAS) 400 for real time subset geometry screening for varying satellite constellations. The GBAS 400 includes a local ground facility 420. The local ground facility 420 includes a GPS antenna and receiver 421. The GPS antenna receiver 421 are coupled to a DGPS 423. The DGPS is configured to provide real time subset geometry screening for varying satellite constellations, including calculating and broadcasting the correct $\sigma_{vig}$ inflation value. In some embodiments, the DGPS also computes other differential corrections, provides GPS signal integrity checks, and approach coordinates. The DGPS is coupled to an encoder/transmitter for outgoing communications to the aircraft 410 via a VHF data broadcast (VDB), and a receiver/decoder for incoming communications from the VHF Data Receiver 427. Aircraft 410 includes a datalink device 411 that is configured to communicate with the VDB 429.

EXAMPLE EMBODIMENTS

Example 1 includes a method for real time subset geometry screening comprising the steps of: determining a list of satellites in view of a ground based augmentation system in a navigation satellite system for a subsequent time interval in the future; defining at least one set of subset geometries from the list of available satellites; calculating a respective first $\sigma_{vig}$ for each of the at least one set of subset geometries, wherein $\sigma_{vig}$ is a vertical ionosphere gradient standard deviation; setting a respective broadcast $\sigma_{vig}$ for each set of subset geometries as the larger of the first $\sigma_{vig}$ and a second $\sigma_{vig}$, wherein the second $\sigma_{vig}$ was calculated for the previous time interval; saving the first $\sigma_{vig}$ for a next iteration of the method; and selecting from the plurality of broadcast $\sigma_{vig}$ to match an available broadcast constellation.

Example 2 includes the method of example 1, wherein the next time interval is 150 seconds into the future, each time interval being 150 seconds.

Example 3 includes the method of any of examples 1-2, wherein if the list of available satellites is greater than 10 satellites, five sets of subset geometries are used.

Example 4 includes the method of any of examples 1-3, wherein five broadcast $\sigma_{vig}$ values are calculated, one of the sets of subset geometries comprises all combinations of 8 to the number of available satellites.

Example 5 includes the method of any of examples 1-2, and 4, wherein if the list of available satellites is less than 10, but greater than or equal to 6, the number of sets of subset geometries used is the number of satellites minus 5.

Example 6 includes the method of any of examples 1-5, wherein broadcast $\sigma_{vig}$ values are calculated, one for each of the respective sets of subset geometries.

Example 7 includes the methods of any of examples 1-2, wherein if the list of available satellites is 5 or 4, only one set of subset geometries is used.

Example 8 includes the method of any of examples 1 and 7, wherein a broadcast $\sigma_{vig}$ is calculated to protect the single set of subset geometries of all 5 and/or 4 satellite combinations.

Example 9 includes an apparatus for executing real time subset geometry screening comprising: a microprocessor; and a non-transitory computer readable medium; wherein, the computer readable medium is configured to provide instructions to the microprocessor to execute a real time subset geometry screening function; wherein the real time subset geometry screening function causes the microprocessor to: determine a list of satellites in view of a ground based augmentation system in a navigation satellite system for a subsequent time interval in the future; define at least one set of subset geometries from the list of available satellites; calculate a respective first $\sigma_{vig}$ for each of the at least one set of subset geometries, wherein $\sigma_{vig}$ is a vertical iono gradient standard deviation; set a respective broadcast $\sigma_{vig}$ for each set of subset geometries as the larger of the first $\sigma_{vig}$ and a second $\sigma_{vig}$, wherein the second $\sigma_{vig}$ was calculated for the previous time interval; save the first $\sigma_{vig}$ for a next iteration of the method; and select from the plurality of broadcast $\sigma_{vig}$ to match an available broadcast constellation.

Example 10 includes the apparatus of example 9, wherein the microprocessor retrieves global positioning system (GPS) information from a GPS unit, wherein the GPS unit comprises a GPS antenna and GPS receiver, wherein GPS information comprises satellite health and satellite position parameters by which to compute satellite elevation and its corresponding visibility.

Example 11 includes the apparatuses of any of examples 9-10, wherein the GPU unit is separate from the apparatus for executing real time subset geometry screening.

Example 12 includes the apparatuses of any of examples 9-11, wherein the GPU unit is a remote satellite monitoring unit (RSMU).

Example 13 includes the apparatuses of any of examples 9-12 further comprising a very high frequency (VHF) broadcast unit, wherein the VHF broadcast unit comprises a VHF antenna and VHF radio, wherein the VHF broadcast unit is configured to broadcast the selected broadcast $\sigma_{vig}$.

Example 14 includes the apparatuses of any of examples 9-13, wherein the VHF broadcast unit is a VHF Data Broadcast (VDB) cabinet.

Example 15 includes the apparatuses of any of examples 9-14, wherein the apparatus for executing real time subset geometry screening is a differential global positioning system (DGPS).

Example 16 includes the apparatuses of any of examples 9-15, wherein the apparatus for executing real time subset geometry screening is the Honeywell SLS-4000.

Example 17 includes a system for real time subset geometry screening comprising: a local ground facility, wherein the local ground facility comprises: a real time geometry subset screening device; wherein, the real time subset geometry screening device is configured to: determine a list of satellites in view of a ground based augmentation system in a navigation satellite system for a subsequent time interval in the future; define at least one set of subset geometries from the list of available satellites; calculate a respective first $\sigma_{vig}$ for each of the at least one set of subset geometries, wherein $\sigma_{vig}$ is a vertical iono gradient standard deviation; set a respective broadcast $\sigma_{vig}$ for each set of subset geometries as the larger of the first $\sigma_{vig}$ and a second $\sigma_{vig}$, wherein the second $\sigma_{vig}$ was calculated for the previous time interval; save the first $\sigma_{vig}$ for a next iteration of the method; and select from the plurality of broadcast $\sigma_{vig}$ to match an available broadcast constellation; a global positioning system (GPS) receiver coupled to the DGPS; a GPS antenna coupled to the GPS receiver; a very high frequency data broadcast (VDB), in communication with the DGPS; an encoder and transmitter configured to encode and transmit outgoing communications from the DGPS to the VDB; and a receiver and decoder configured to receive and decode incoming communications from the VDB to the DGPS.

Example 18 includes the system of example 17, wherein the LGF is part of a ground based augmentation system such as a Honeywell SLS-4000.

Example 19 includes the system of any of examples 17-18, wherein the LGF is a local area augmentation system ground facility.

Example 20 includes the system of any of examples 17-19, further comprising an aircraft, wherein the aircraft comprises a datalink device in communication with the VDB.

What is claimed is:

1. A method for real time subset geometry screening comprising the steps of:
   receiving almanac data of satellites via a navigation satellite system (NSS) receiver;
   using the almanac data, determining a list of available satellites of a ground based augmentation system in a navigation satellite system, the list of available satellites including satellites that are in view at end of current time interval and potential satellites that will enter or leave a selective mask during the subsequent time interval;
   defining at least one set of subset geometries from the list of available satellites;
   calculating a respective first $\sigma_{vig}$ for each of the at least one set of subset geometries, wherein $\sigma_{vig}$ is a vertical ionosphere gradient standard deviation, and wherein the respective first $\sigma_{vig}$ is calculated for the subsequent time interval;
   setting a respective broadcast $\sigma_{vig}$ for each set of subset geometries, wherein each respective broadcast $\sigma_{vig}$ is the larger of the respective first $\sigma_{vig}$ and a second $\sigma_{vig}$, and wherein the second $\sigma_{vig}$ was calculated for the current time interval;
   saving the respective broadcast $\sigma_{vig}$ as the second $\sigma_{vig}$ for a next iteration of the method;
   selecting a matched broadcast $\sigma_{vig}$ from the respective broadcast $\sigma_{vig}$ for each set of subset geometries to match an available broadcast constellation; and
   broadcasting the matched broadcast $\sigma_{vig}$.

2. The method of claim 1, wherein the subsequent time interval is 150 seconds into the future, each time interval being 150 seconds.

3. The method of claim 1, wherein if the list of available satellites is greater than or equal to 10 satellites, five sets of subset geometries are used.

4. The method of claim 3, wherein if the list of available satellites is greater than or equal to 10 satellites, five broadcast $\sigma_{vig}$ values are calculated, and wherein one of the five sets of subset geometries comprises all combinations of 8 satellites to S satellites, wherein S is the number of available satellites.

5. The method of claim 1, wherein if the list of available satellites is less than 10, but greater than or equal to 6, the number of sets of subset geometries used is the number of satellites minus 5.

6. The method of claim 5, wherein broadcast $\sigma_{vig}$ values are calculated, one for each of the respective sets of subset geometries.

7. The method of claim 1, wherein if the list of available satellites is 5 or 4, only one set of subset geometries is used.

8. The method of claim 7, wherein a broadcast $\sigma_{vig}$ is calculated to protect the only one set of subset geometries of all 5 and/or 4 satellite combinations.

9. An apparatus for executing real time subset geometry screening comprising:
a navigation satellite system (NSS) receiver configured to retrieve almanac data of satellites;
a microprocessor;
a non-transitory computer readable medium; wherein,
the computer readable medium is configured to provide instructions to the microprocessor to execute a real time subset geometry screening function; wherein the real time subset geometry screening function causes the microprocessor to:
determine a list of available satellites of a ground based augmentation system in a navigation satellite system using the almanac data, the list of available satellites including satellites that are in view at end of current time interval and potential satellites that will enter or leave the selective mask during the subsequent time interval;
define at least one set of subset geometries from the list of available satellites;
calculate a respective first $\sigma_{vig}$ for each of the at least one set of subset geometries, wherein $\sigma_{vig}$ is a vertical ionosphere gradient standard deviation, and wherein the first $\sigma_{vig}$ is calculated for the subsequent time interval;
set a respective broadcast $\sigma_{vig}$ for each set of subset geometries as the larger of the first $\sigma_{vig}$ and a second $\sigma_{vig}$, wherein each respective broadcast $\sigma_{vig}$ is the larger of the respective first $\sigma_{vig}$ and a second $\sigma_{vig}$, and wherein the second $\sigma_{vig}$ was calculated for the current time interval;
save the broadcast $\sigma_{vig}$ as the second $\sigma_{vig}$ for a next iteration; and
select a matched broadcast $\sigma_{vig}$ from the respective broadcast $\sigma_{vig}$ for each set of subset geometries to match an available broadcast constellation; and
a navigation satellite system (NSS) broadcast unit configured to broadcast the matched broadcast $\sigma_{vig}$.

10. The apparatus of claim 9, further comprising a global positioning system (GPS) unit, wherein the NSS receiver is a GPS receiver, wherein the GPS unit comprises a GPS antenna and the GPS receiver, and wherein the computer readable medium is configured to provide instructions to the microprocessor to retrieve the almanac data from the GPS unit, wherein the almanac data comprises satellite health and satellite position parameters by which to compute satellite elevation and its corresponding visibility.

11. The apparatus of claim 10, wherein the GPS unit is separate from the apparatus for executing real time subset geometry screening.

12. The apparatus of claim 10, wherein the GPS unit is a remote satellite monitoring unit (RSMU).

13. The apparatus of claim 9, wherein the NSS broadcast unit is a very high frequency (VHF) broadcast unit comprising a VHF antenna and VHF radio.

14. The apparatus of claim 13, wherein the VHF broadcast unit is a VHF Data Broadcast (VDB) cabinet.

15. The apparatus of claim 9, wherein the apparatus for executing real time subset geometry screening is a differential global positioning system (DGPS).

16. A system for real time subset geometry screening comprising:
a local ground facility (LGF), wherein the local ground facility comprises:
a global positioning system (GPS) receiver coupled to a differential global positioning system (DGPS), wherein the GPS receiver is configured to receive almanac data of satellites;
a real time geometry subset screening device, wherein the DGPS includes the real time geometry subset screening device; and wherein, the real time subset geometry screening device is configured to:
determine a list of available satellites of a ground based augmentation system in a navigation satellite system using the almanac data of satellites, the list of available satellites including satellites that are in view at end of current time interval and potential satellites that will enter or leave the selective mask during the subsequent time interval;
define at least one set of subset geometries from the list of available satellites;
calculate a respective first $\sigma_{vig}$ for each of the at least one set of subset geometries, wherein $\sigma_{vig}$ is a vertical ionosphere gradient standard deviation, and wherein the first $\sigma_{vig}$ is calculated for the subsequent time interval;
set a respective broadcast $\sigma_{vig}$ for each set of subset geometries as the larger of the first $\sigma_{vig}$ and a second $\sigma_{vig}$, wherein each respective broadcast $\sigma_{vig}$ is the larger of the respective first $\sigma_{vig}$ and a second $\sigma_{vig}$, and wherein the second $\sigma_{vig}$ was calculated for the current time interval;
save the broadcast $\sigma_{vig}$ as the second $\sigma_{vig}$ for a next iteration; and
select a matched broadcast $\sigma_{vig}$ from the respective broadcast $\sigma_{vig}$ for each set of subset geometries to match an available broadcast constellation; and
wherein the local ground facility further comprises:
a GPS antenna coupled to the GPS receiver;
a very high frequency data broadcast (VDB) cabinet, in communication with the DGPS, wherein the VDB is configured to broadcast the selected broadcast $\sigma_{vig}$;
an encoder and transmitter configured to encode and transmit outgoing communications from the DGPS to the VDB; and
a receiver and decoder configured to receive and decode incoming communications from the VDB to the DGPS.

17. The system of claim 16, wherein the LGF is a local area augmentation system ground facility.

18. The system of claim 16, further comprising an aircraft, wherein the aircraft comprises a datalink device in communication with the VDB.

* * * * *

UNITED STATES PATENT AND TRADEMARK OFFICE
CERTIFICATE OF CORRECTION

PATENT NO. : 9,476,985 B2  
APPLICATION NO. : 13/847645  
DATED : October 25, 2016  
INVENTOR(S) : Scheitlin Page 1 of 1

It is certified that error appears in the above-identified patent and that said Letters Patent is hereby corrected as shown below:

On the Title Page

Item (54) and in the Specification, Column 1, Line 1, title, replace "SYSTEM AND METHOD FOR REAL TIME SUBSET GEOMETRY SCREENING SATELLITE CONSTELLATIONS" with -- SYSTEM AND METHOD FOR REAL TIME SUBSET GEOMETRY SCREENING FOR VARYING SATELLITE CONSTELLATIONS --.

Signed and Sealed this  
Twenty-eighth Day of May, 2019

Andrei Iancu  
*Director of the United States Patent and Trademark Office*